(12) United States Patent
Pawar et al.

(10) Patent No.: US 11,375,443 B1
(45) Date of Patent: Jun. 28, 2022

(54) SUBCARRIER SPACING SELECTION BASED ON ANTENNA CONFIGURATION

(71) Applicant: Sprint Spectrum LP, Overland Park, KS (US)

(72) Inventors: Hemanth Pawar, Brambleton, VA (US); Krishna Sitaram, Chantilly, VA (US); Shilpa Kowdley, Brambleton, VA (US)

(73) Assignee: T-Mobile Innovations LLC, Overland Park, KS (US)

( * ) Notice: Subject to any disclaimer, the term of this patent is extended or adjusted under 35 U.S.C. 154(b) by 331 days.

(21) Appl. No.: 16/531,660

(22) Filed: Aug. 5, 2019

(51) Int. Cl.
*H04W 48/18* (2009.01)
*H04W 92/10* (2009.01)
*H04L 5/00* (2006.01)

(52) U.S. Cl.
CPC ........... *H04W 48/18* (2013.01); *H04L 5/0094* (2013.01); *H04W 92/10* (2013.01)

(58) Field of Classification Search
CPC ...... H04W 48/18; H04W 92/10; H04L 5/0094
See application file for complete search history.

(56) References Cited

U.S. PATENT DOCUMENTS

| 2017/0170888 | A1* | 6/2017 | Yrjola | H04W 16/28 |
| 2018/0007673 | A1* | 1/2018 | Fwu | H04L 5/0092 |
| 2019/0363809 | A1* | 11/2019 | Yoon | H04W 56/00 |
| 2020/0015298 | A1* | 1/2020 | Chae | H04W 72/02 |

* cited by examiner

*Primary Examiner* — Joseph A Bednash (57) ABSTRACT

Subcarrier spacing is selected based on a change in an antenna configuration of an access node, wherein a spectral efficiency of the access node is reduced by the change in the antenna configuration. For example, the change in the antenna configuration is based on the access node deploying additional radio air interfaces using a limited quantity of antenna elements. The subcarrier spacing for at least one radio air interface is increased based on the reduction in spectral efficiency.

14 Claims, 7 Drawing Sheets

DETERMINE A CHANGE IN AN ANTENNA CONFIGURATION OF AN ACCESS NODE
410

BASED ON THE CHANGE IN ANTENNA CONFIGURATION, SELECT A SUBCARRIER SPACING FOR THE ACCESS NODE
420

SUBCARRIER SPACING SELECTION BASED ON ANTENNA CONFIGURATION

TECHNICAL BACKGROUND

A heterogeneous network can be configured to include various types of access nodes that are configured to deploy radio air interfaces of different types, such as 4G long-term evolution (LTE), 5G new radio (NR), and so on. Further, these different radio air interfaces or sectors may be configured differently (i.e. with different subcarrier spacing, frame configuration, etc.). For example, while 4G LTE networks are configured to use a 15 kHz subcarrier spacing, 5G NR networks can be configured with different subcarrier spacings, including 15 KHz, 30 KHz, 60 KHz, and so on. Deployment of different radio air interface is enabled by configuring an antenna array of an access node into different sets, with each set comprising a different plurality of antenna elements.

However, when the same access node is configured to deploy additional radio air interfaces (e.g. 4G+5G, or 5G+5G), a spectral efficiency of each radio air interface may be reduced. The reduction can be caused by using fewer antenna elements for each radio air interface, since the total number of antenna elements within an antenna array may be limited, and a maximum transmit power is available for each antenna element. Since an access node can comprise a plurality of antenna arrays, while each antenna array is configured to deploy or steer beams over a sector, deploying multiple different radio air interfaces over a single sector may cause reductions in power and, therefore, the spectral efficiency of the radio air interfaces. What is therefore needed is a means to mitigate the reduction in spectral efficiency of a sector when additional radio air interfaces are deployed using limited antenna elements of an access node.

Overview

Exemplary embodiments described herein include methods, systems, and processing nodes for selection of subcarrier spacing in a wireless network based on changes in an antenna configuration of an access node. An exemplary method for selecting a subcarrier spacing in a wireless network includes determining a change in an antenna configuration of an access node, wherein the access node is configured to deploy a plurality of radio air interfaces using a plurality of antenna elements and, responsive to determining the change in the antenna configuration, adjusting a subcarrier spacing for at least one of the plurality of radio air interfaces.

An exemplary system for selecting a subcarrier spacing in a wireless network includes a processing node and a processor coupled to the processing node. The processor may be configured to perform operations including determining that an access node configured to deploy a first radio air interface using a plurality of antenna elements starts deploying a second radio air interface using a subset of the plurality of antenna elements and, responsive to determining that the access node starts deploying the second radio air interface, increasing a subcarrier spacing utilized by at least one of the first and second radio air interfaces.

An exemplary processing node for selecting a subcarrier spacing in a wireless network is configured to perform operations including determining a change in an antenna configuration of an access node, wherein the access node is configured to deploy a plurality of radio air interfaces using a plurality of antenna elements, and wherein a spectral efficiency of the access node is reduced by the change in the antenna configuration, and adjusting a subcarrier spacing for at least one of the plurality of radio air interfaces based on the reduction in spectral efficiency.

DETAILED DESCRIPTION

The disclosed embodiments illustrate methods, systems, and processing nodes for selection of subcarrier spacing in a wireless network based on changes in an antenna configuration of an access node. Selecting a subcarrier spacing as described herein includes determining a change in an antenna configuration of an access node such that a spectral efficiency of the access node may be reduced by the change in the antenna configuration. For example, an access node configured to deploy a plurality of radio air interfaces using a plurality of antenna elements may be configured or instructed (by, for example, a processing node communicatively coupled to the access node) to deploy an additional radio air interface using a subset of the plurality of antenna elements. Thus, a total power available for at least one of the plurality of radio air interface is correspondingly reduced by the smaller quantity of antenna elements available. Thus, a subcarrier spacing for at least one of the plurality of radio air interfaces can be adjusted based on the reduction in spectral efficiency. For example, adjusting the subcarrier spacing can include increasing the subcarrier spacing for the at least one of the plurality of radio air interfaces.

The access node may include an access node of any type, including macrocell access nodes such as Long-Term-Evolution (LTE) eNodeBs or 5G New Radio (NR) gNodeBs, mini access nodes, home eNodeBs or gNodeBs, etc., and may include a plurality of antenna elements arranged in one or more sets or arrays, wherein each set or array is configured to steer or form one or more beams over a geographical region referred to herein as a "sector." Further, the antenna elements can include both transmit antenna elements and receive antenna elements. For example, a single antenna array can include 128 transmit antenna elements and 128 receive antenna elements (hereinafter referred to as 128T128R). In other exemplary embodiments, a single antenna array can include 64 transmit antenna elements and 64 receive antenna elements (hereinafter referred to as 64T64R). In other exemplary embodiments, a single antenna array can include 32 transmit antenna elements and 32 receive antenna elements (hereinafter referred to as 32T32R). In other exemplary embodiments, a single antenna array can include 16 transmit antenna elements and 16 receive antenna elements (hereinafter referred to as 16T16R). In other exemplary embodiments, a single antenna array can include 8 transmit antenna elements and 8 receive antenna elements (hereinafter referred to as 8T8R). Thus, while the total number of antenna elements varies based on the access node, determining a change in the antenna configuration can include determining an increase or reduction in the number of antenna elements used to deploy a sector, or a radio air interface within the sector. Further, determining the change in a first number of antenna elements can include determining a reduction in the first number of antenna elements used to deploy a first radio air interface, and the subcarrier spacing can be increased for at least one of the plurality of radio air interfaces. For example, determining the reduction in the first number of antenna elements includes determining that the first number of antenna elements changes from 128 antenna elements to a smaller number of antenna elements, such as 64 antenna elements, 32 antenna elements, or 16 antenna elements. Hereinafter, for the purposes of this disclosure, a number of antenna elements includes both transmit and receive antenna elements, in any ratio or combination.

In an exemplary embodiment, the reduction in the first number of antenna elements is caused by the access node being configured to deploy a second radio air interface using a second number of antenna elements from the plurality of antenna elements. In such embodiments, adjusting the subcarrier spacing includes increasing the subcarrier spacing for the first radio air interface. For example, the first radio air interface is a 5G radio air interface, and the second radio air interface is a 4G radio air interface. Since 5G radio air interfaces have configurable subcarrier spacings, while 4G radio air interfaces are only configured with a 15 kHz subcarrier spacing, the 5G radio air interface (i.e. the first radio air interface) can be configured with a 30 kHz subcarrier spacing. Thus, the spectral efficiency of the 5G radio air interface is improved to counter the reduction in the antenna elements used to deploy the 5G radio air interface. Alternatively or in addition, the first radio air interface can be a 4G radio air interface, and the second radio air interface can be a 5G radio air interface. In such embodiments, adjusting the subcarrier spacing further comprises increasing the subcarrier spacing for the second radio air interface (i.e. the 5G radio air interface). Further in an exemplary embodiment, if both first and second radio air interfaces are 5G radio air interfaces (i.e., the access node is configured to switch from deploying one 5G radio air interface using an antenna array to deploying two 5G radio air interfaces using the same antenna array), then the subcarrier spacing of either one or both radio air interfaces can be increased.

In exemplary embodiments described herein, the subcarrier spacing is increased from a 15 kHz subcarrier spacing to one or more of: a 30 kHz subcarrier spacing, a 60 kHz subcarrier spacing, or a 120 kHz subcarrier spacing. Further, a selected subcarrier spacing is transmitted to all wireless devices within a sector via, for example, a master information bit (MIB). Similarly, these operations may be repeated for additional wireless sectors deployed by additional antenna arrays of the access node. In addition, these determining and adjusting operations are repeated for different radio air interfaces deployed within different sectors. For example, since each antenna array is configured to deploy one or more radio air interfaces within a sector, these operations can be independently performed for each antenna array based on the air interface needs in different sectors, or based on a spectral efficiency of each sector. Further, the different subcarrier spacings can be selected based on a size of the subset of antenna elements used to deploy each radio air interface.

Similar operations may be performed by an exemplary system described herein and similar operations may be performed by a processing node communicatively coupled to any other network node within the wireless network, such as an access node or a controller node. These and other embodiments are further described herein and with reference to FIGS. 1-8.

Figure 1:
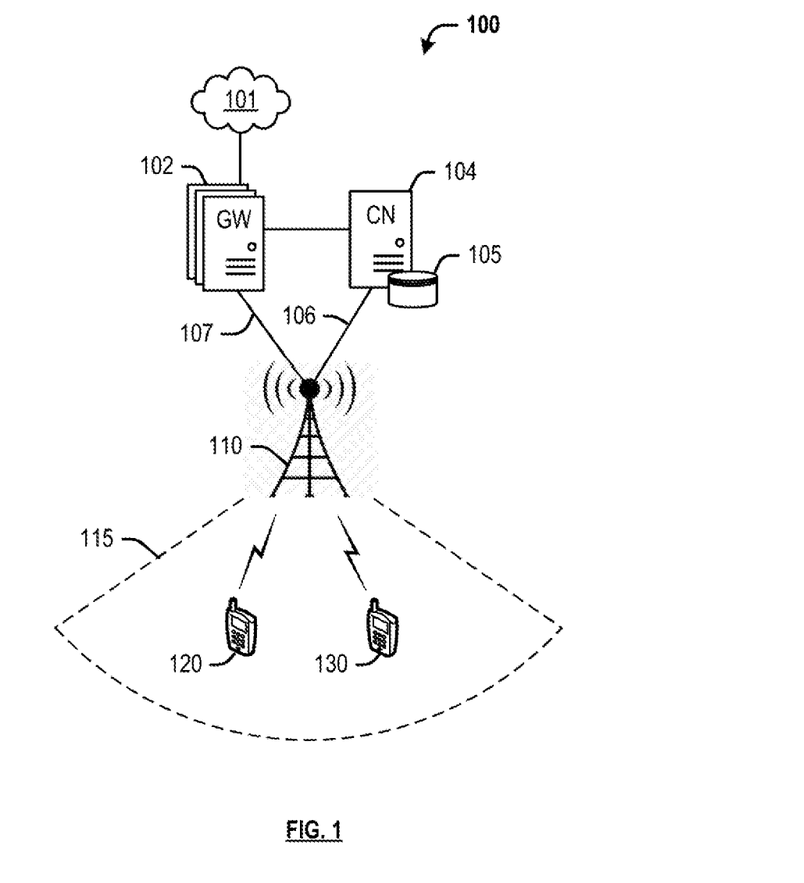
FIG. 1 illustrates an exemplary system for selecting a subcarrier spacing in a wireless network based on changes in an antenna configuration.

FIG. 1 depicts an exemplary system 100 for selecting a subcarrier spacing in a wireless network. System 100 comprises a communication network 101, gateway 102, controller node 104, access node 110, and wireless devices 120, 130. Access node may include an access node of any type, including macrocell access nodes such as Long-Term-Evolution (LTE) eNodeBs or 5G New Radio (NR) gNodeBs, mini access nodes, home eNodeBs or gNodeBs, etc., and may include a plurality of antenna elements arranged in one or more arrays, wherein each antenna array is configured to steer or form one or more beams over a geographical region 115, referred to herein as a sector 115. Wireless devices 120 and 130 are located within sector 115 and access network services from access node 110. Further, by virtue of the plurality of antenna elements, access node 110 can be capable of deploying multiple radio air interfaces within sector 115, including 4G and 5G radio air interfaces to which wireless devices 120, 130 can respectively attach.

Further, a processing node communicatively coupled to any network node within system 100 (such as, for example, access node 110 or controller node 104) can be configured to select a subcarrier spacing used by at least one radio air interface in sector 115 by determining a change in an antenna configuration of access node 110 and, responsive to determining the change in the antenna configuration, adjusting a subcarrier spacing for at least one of the plurality of radio air interfaces within sector 115. For example, the change in the antenna configuration can cause a spectral efficiency of the access node 110 to be reduced. If access node is first configured to deploy only a 4G carrier (using all antenna elements within the antenna array used in sector 115), access node may subsequently be configured or instructed (by, for example, a processing node communicatively coupled to the access node 110 or controller node 104) to deploy an additional 5G radio air interface using a subset of the plurality of antenna elements. As a consequence, a total power available for one or more of the 4G and 5G radio air interfaces may be reduced. Since a 4G radio air interface has a fixed subcarrier spacing, the subcarrier spacing of the 5G radio air interface can be increased to improve the spectral efficiency of the 5G radio air interface. The subcarrier spacing can be increased from a 15 kHz subcarrier spacing to one or more of: a 30 kHz subcarrier spacing, a 60 kHz subcarrier spacing, or a 120 kHz subcarrier spacing. Further, a selected subcarrier spacing is transmitted to all wireless devices 120, 130 within sector 115 via, for example, a master information bit (MIB). Similarly, these operations may be repeated for additional wireless sectors (not shown) deployed by additional antenna arrays of the access node 110.

Access node 110 can be any network node configured to provide communication between wireless devices 120, 130 and communication network 101, including standard access nodes and/or short range, low power, small access nodes. For instance, access node 110 may include any standard access node, such as a macrocell access node, base transceiver station, a radio base station, next generation or gigabit NodeBs (gNBs) in 5G networks, or enhanced eNodeBs (eNBs) in 4G/LTE networks, or the like. In an exemplary embodiment, a macrocell access node can have a coverage area 115 in the range of approximately five kilometers to thirty five kilometers and an output power in the tens of watts. In other embodiments, access node 110 can be a small access node including a microcell access node, a picocell access node, a femtocell access node, or the like such as a home NodeB or a home eNodeB device. Moreover, it is noted that while access node 110 is illustrated in FIG. 1, any number of access nodes can be implemented within system 100.

Access node 110 can comprise processors and associated circuitry to execute or direct the execution of computer-readable instructions to perform operations such as those further described herein. Briefly, access node 110 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Further, access node 110 can receive instructions and other input at a user interface. Access node 110 communicate with gateway node 102 and controller node 104 via communication links 106, 107. Access node 110 may communicate with other access nodes (not shown) using a direct link such as an X2 link or similar.

Wireless devices 120, 130 may be any device, system, combination of devices, or other such communication platform capable of communicating wirelessly with access node 110 using one or more frequency bands deployed therefrom. Wireless devices 120, 130 may be, for example, a mobile phone, a wireless phone, a wireless modem, a personal digital assistant (PDA), a voice over internet protocol (VoIP) phone, a voice over packet (VOP) phone, or a soft phone, as well as other types of devices or systems that can exchange audio or data via access node 110. Other types of communication platforms are possible.

Communication network 101 can be a wired and/or wireless communication network, and can comprise processing nodes, routers, gateways, and physical and/or wireless data links for carrying data among various network elements, including combinations thereof, and can include a local area network a wide area network, and an internetwork (including the Internet). Communication network 101 can be capable of carrying data, for example, to support voice, push-to-talk, broadcast video, and data communications by wireless devices 120, 130. Wireless network protocols can comprise MBMS, code division multiple access (CDMA) 1×RTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), Worldwide Interoperability for Microwave Access (WiMAX), Fourth Generation broadband cellular (4G, LTE Advanced, etc.), and Fifth Generation mobile networks or wireless systems (5G, 5G New Radio ("5G NR"), or 5G LTE). Wired network protocols that may be utilized by communication network 101 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 101 can also comprise additional base stations, controller nodes, telephony switches, internet routers, network gateways, computer systems, communication links, or some other type of communication equipment, and combinations thereof.

Communication links 106, 107 can use various communication media, such as air, space, metal, optical fiber, or some other signal propagation path—including combinations thereof. Communication links 106, 107 can be wired or wireless and use various communication protocols such as Internet, Internet protocol (IP), local-area network (LAN), optical networking, hybrid fiber coax (HFC), telephony, T1, or some other communication format—including combinations, improvements, or variations thereof. Wireless communication links can be a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), Long Term Evolution (LTE), 5G NR, or combinations thereof. Communication links 106, 107 may include S1 communication links. Other wireless protocols can also be used. Communication links 106, 107 can be a direct link or might include various equipment, intermediate components, systems, and networks. Communication links 106, 107 may comprise many different signals sharing the same link.

Gateway node 102 can be any network node configured to interface with other network nodes using various protocols. Gateway node 102 can communicate user data over system 100. Gateway node 102 can be a standalone computing device, computing system, or network component, and can be accessible, for example, by a wired or wireless connection, or through an indirect connection such as through a computer network or communication network. For example, gateway node 102 can include a serving gateway (SGW) and/or a public data network gateway (PGW), etc. One of ordinary skill in the art would recognize that gateway node 102 is not limited to any specific technology architecture, such as Long Term Evolution (LTE) or 5G NR, and can be used with any network architecture and/or protocol.

Gateway node 102 can comprise a processor and associated circuitry to execute or direct the execution of computer-readable instructions to obtain information. Gateway node 102 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Gateway node 102 can receive instructions and other input at a user interface.

Controller node 104 can be any network node configured to communicate information and/or control information over system 100. Controller node 104 can be configured to transmit control information associated with a handover procedure. Controller node 104 can be a standalone computing device, computing system, or network component, and can be accessible, for example, by a wired or wireless connection, or through an indirect connection such as through a computer network or communication network. For example, controller node 104 can include a mobility management entity (MME), a Home Subscriber Server (HSS), a Policy Control and Charging Rules Function (PCRF), an authentication, authorization, and accounting (AAA) node, a rights management server (RMS), a subscriber provisioning server (SPS), a policy server, etc. One of ordinary skill in the art would recognize that controller node 104 is not limited to any specific technology architecture, such as Long Term Evolution (LTE) or 5G NR, and can be used with any network architecture and/or protocol.

Controller node 104 can comprise a processor and associated circuitry to execute or direct the execution of computer-readable instructions to obtain information. Controller node 104 can retrieve and execute software from storage, which can include a disk drive, a flash drive, memory circuitry, or some other memory device, and which can be local or remotely accessible. In an exemplary embodiment, controller node 104 includes a database 105 for storing information, such as antenna configurations of access node 110 (and other access nodes within system 100), and so on. This information may be requested by or shared with access node 110 via communication links 106, 107, X2 connections, and so on. The software comprises computer programs, firmware, or some other form of machine-readable instructions, and may include an operating system, utilities, drivers, network interfaces, applications, or some other type of software, and combinations thereof. Controller node 104 can receive instructions and other input at a user interface.

Other network elements may be present in system 100 to facilitate communication but are omitted for clarity, such as base stations, base station controllers, mobile switching centers, dispatch application processors, and location registers such as a home location register or visitor location register. Furthermore, other network elements that are omitted for clarity may be present to facilitate communication, such as additional processing nodes, routers, gateways, and physical and/or wireless data links for carrying data among the various network elements, e.g. between access node 110 and communication network 101.

The methods, systems, devices, networks, access nodes, and equipment described herein may be implemented with, contain, or be executed by one or more computer systems and/or processing nodes. The methods described above may also be stored on a non-transitory computer readable medium. Many of the elements of communication system 100 may be, comprise, or include computers systems and/or processing nodes, including access nodes, controller nodes, and gateway nodes described herein.

Figure 2:
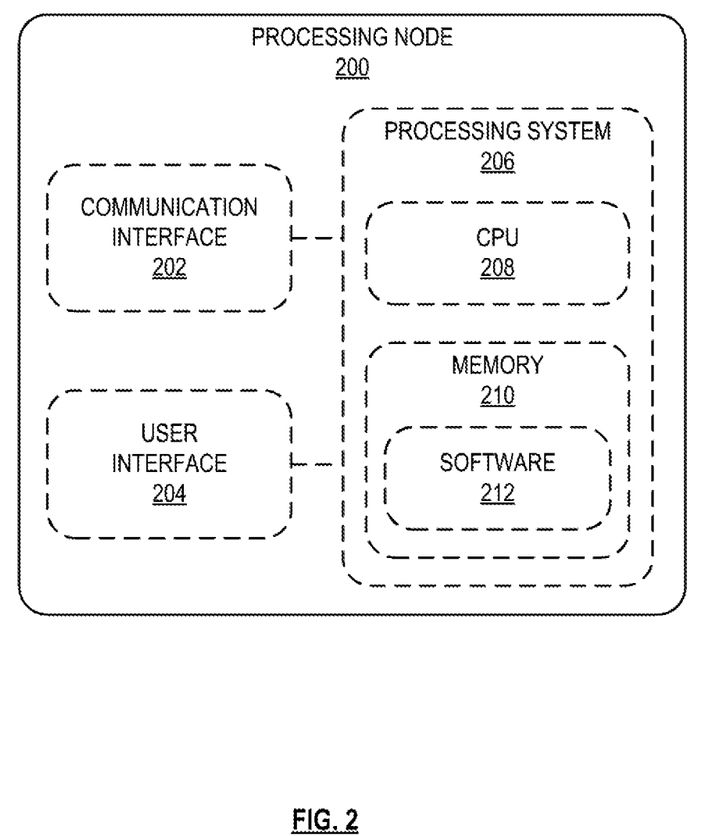
FIG. 2 illustrates an exemplary processing node for selecting a subcarrier spacing in a wireless network.

FIG. 2 depicts an exemplary processing node 200 for selecting a subcarrier spacing in a wireless network. Processing node comprises a communication interface 202, user interface 204, and processing system 206 in communication with communication interface 202 and user interface 204. Processing system 206 includes a central processing unit (CPU) 208, and a memory 210, which can comprise a disk drive, flash drive, memory circuitry, or other memory device. Memory 210 can store computer programs, firmware, or some other form of machine-readable instructions, including an operating system, utilities, drivers, network interfaces, applications, or some other type of software. Further, memory 210 can store software 212, which may be executed to perform the operations described herein. Processing system 206 may include other circuitry to retrieve and execute software 212 from memory 210. Processing node 200 may further include other components such as a power management unit, a control interface unit, etc., which are omitted for clarity. Communication interface 202 permits processing node 200 to communicate with other network elements. User interface 204 permits the configuration and control of the operation of processing node 200.

In an exemplary embodiment, software 212 includes instructions that enable processing node 200 to perform operations including determining a change in an antenna configuration of an access node, wherein the access node is configured to deploy a plurality of radio air interfaces using a plurality of antenna elements and, responsive to determining the change in the antenna configuration, adjusting a subcarrier spacing for at least one of the plurality of radio air interfaces. In another exemplary embodiment, software 212 includes instructions that enable processing node 200 to perform operations including determining that an access node configured to deploy a first radio air interface using a plurality of antenna elements starts deploying a second radio air interface using a subset of the plurality of antenna elements and, responsive to determining that the access node starts deploying the second radio air interface, increasing a subcarrier spacing utilized by at least one of the first and second radio air interfaces. In yet another exemplary embodiment, software 212 includes instructions that enable processing node 200 to perform operations including determining a change in an antenna configuration of an access node, wherein the access node is configured to deploy a plurality of radio air interfaces using a plurality of antenna elements, and wherein a spectral efficiency of the access node is reduced by the change in the antenna configuration, and adjusting a subcarrier spacing for at least one of the plurality of radio air interfaces based on the reduction in spectral efficiency.

Figure 3:
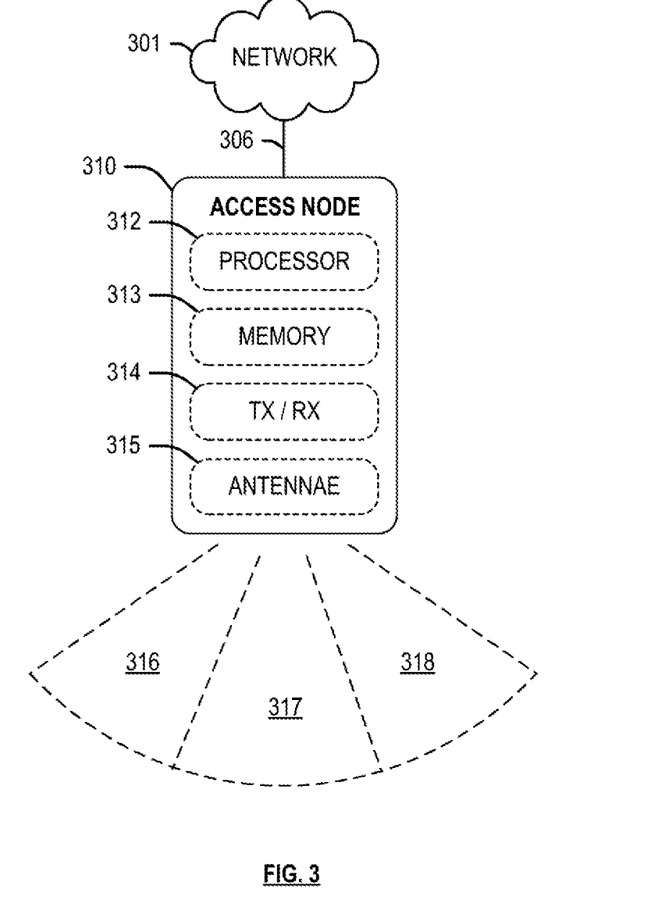
FIG. 3 illustrates an exemplary access node for selecting a subcarrier spacing in a wireless network.

FIG. 3 depicts an exemplary access node 310 for selecting a subcarrier spacing in a wireless network. Access node 310 may be configured as an access point for providing network services from network 301 to end-user wireless devices via a radio-air interface deployed therefrom. Access node 310 is illustrated as comprising a processor 312, a memory 313 (for storing instructions that are performed by processor 312), a transceiver 314, and antennae 315 for deploying a radio air interface over wireless sectors 316, 317, and 318. One pair of transceivers and antennae are illustrated herein solely to simplify the written description, and it may be evident to those having ordinary skill in the art, that any combination of transceivers and antennae may be incorporated in order to deploy different sectors that are configured with different subcarrier spacings, as well as formed beams, MU-MIMO data streams, and/or to facilitate communication with other network nodes on network 301. Further, access node 310 is communicatively coupled to network 301 via communication interface 306, which may be any wired or wireless link as described above.

In an exemplary embodiment, memory 313 includes instructions that enable access node 310 to perform operations comprising including determining a change in an antenna configuration of antennae 315 and, responsive to determining the change in the antenna configuration, adjusting a subcarrier spacing for at least one of the plurality of radio air interfaces deployed within sectors 316, 317, or 318. In another exemplary embodiment, memory 313 includes instructions for determining that access node 310 is configured to deploy a first radio air interface using a plurality of antenna elements 315, that access node 310 starts deploying a second radio air interface using a subset of the plurality of antenna elements 315 and, responsive to determining that the access node 310 starts deploying the second radio air interface, increasing a subcarrier spacing utilized by at least one of the first and second radio air interfaces. In yet another exemplary embodiment, memory 313 includes instructions for determining a change in an antenna configuration of access node 310, wherein the access node is configured to deploy a plurality of radio air interfaces over sectors 316, 317, 318 using a plurality of antenna elements 315, and wherein a spectral efficiency of the access node 310 is reduced by the change in the antenna configuration, and adjusting a subcarrier spacing for at least one of the plurality of radio air interfaces based on the reduction in spectral efficiency.

Figure 4:
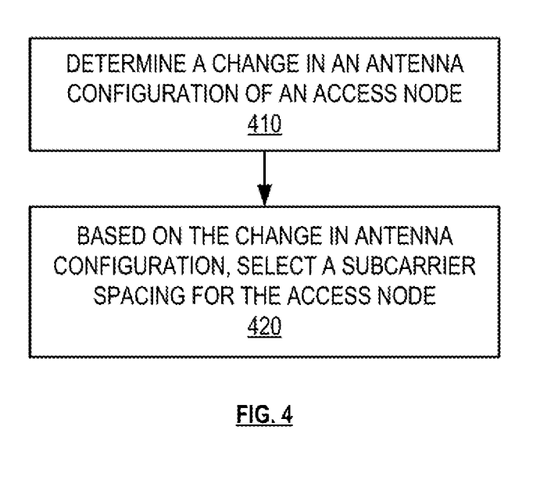
FIG. 4 illustrates an exemplary method for selecting a subcarrier spacing in a wireless network.

FIG. 4 illustrates an exemplary method for selecting a subcarrier spacing in a wireless network. The method will be discussed with reference to the exemplary communication system 100 illustrated in FIG. 1. However, the method can be implemented with any suitable communication system. In addition, although FIG. 4 depicts steps performed in a particular order for purposes of illustration and discussion, the methods discussed herein are not limited to any particular order or arrangement. One skilled in the art, using the disclosures provided herein, will appreciate that various steps of the methods can be omitted, rearranged, combined, and/or adapted in various ways.

At 410, a change is determined in an antenna configuration of an access node. The access node may include an access node of any type, including macrocell access nodes such as Long-Term-Evolution (LTE) eNodeBs or 5G New Radio (NR) gNodeBs, mini access nodes, home eNodeBs or gNodeBs, etc., and may include a plurality of antenna elements arranged in one or more sets or arrays, wherein each set or array is configured to steer or form one or more beams over a sector. Further, the antenna elements can include both transmit antenna elements and receive antenna elements. For example, a single antenna array can include 128T128R, 64T64R, 32T32R, 16T16R, or 8T8R. While the total number of antenna elements varies based on the access node, determining a change in the antenna configuration can include determining an increase or reduction in the number of antenna elements used to deploy a sector, or a radio air interface within the sector. Further, determining the change in a first number of antenna elements can include determining a reduction in the first number of antenna elements used to deploy a first radio air interface. For example, determining the reduction in the first number of antenna elements includes determining that the first number of antenna elements changes from 128 antenna elements to a smaller number of antenna elements, such as 64 antenna elements, 32 antenna elements, or 16 antenna elements. The reduction in the first number of antenna elements is caused by the access node being configured to deploy a second radio air interface using a second number of antenna elements from the plurality of antenna elements.

Further, at 420, based on the change in antenna configuration, a subcarrier spacing is selected for the access node. Since the change in antenna configuration may result in a reduced spectral efficiency for one or more radio air interfaces deployed by the access node, the subcarrier spacing for these one or more radio air interfaces can be increased to improve the spectral efficiency (or to counter any reduction in the spectral efficiency). In exemplary embodiments described herein, the subcarrier spacing is increased from a 15 kHz subcarrier spacing to one or more of: a 30 kHz subcarrier spacing, a 60 kHz subcarrier spacing, or a 120 kHz subcarrier spacing. Further, a selected subcarrier spacing is transmitted to all wireless devices within a sector via, for example, a master information bit (MIB). Similarly, these operations may be repeated for additional wireless sectors deployed by additional antenna arrays of the access node. In addition, these determining and adjusting operations are repeated for different radio air interfaces deployed within different sectors. For example, since each antenna array is configured to deploy one or more radio air interfaces within a sector, these operations can be independently performed for each antenna array based on the air interface needs in different sectors, or based on a spectral efficiency of each sector. Further, the different subcarrier spacings can be selected based on a size of the subset of antenna elements used to deploy each radio air interface.

Figure 5:
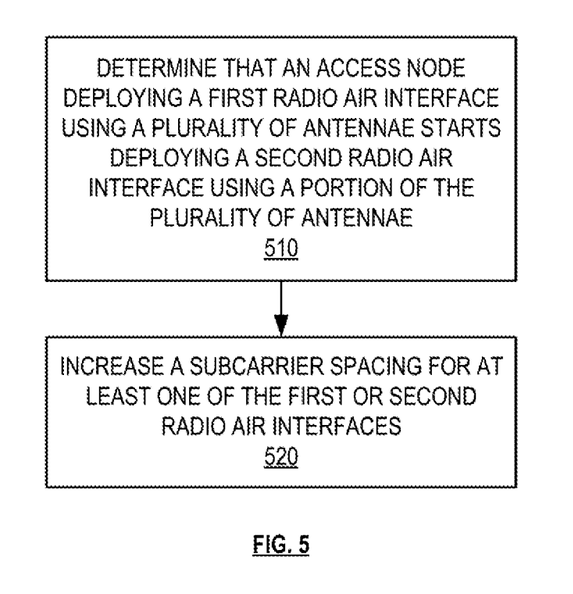
FIG. 5 illustrates another exemplary method for selecting a subcarrier spacing in a wireless network.

FIG. 5 illustrates another exemplary method for selecting a subcarrier spacing in a wireless network. The method will be discussed with reference to the exemplary communication system 100 illustrated in FIG. 1. However, the method can be implemented with any suitable communication system. In addition, although FIG. 5 depicts steps performed in a particular order for purposes of illustration and discussion, the methods discussed herein are not limited to any particular order or arrangement. One skilled in the art, using the disclosures provided herein, will appreciate that various steps of the methods can be omitted, rearranged, combined, and/or adapted in various ways.

At 510, it is determined that an access node deploying a first radio air interface using a plurality of antenna elements starts deploying a second radio air interface using a portion of the plurality of antenna elements, thus causing a change in the antenna configuration of the access node. The access node may include an access node of any type, including macrocell access nodes such as Long-Term-Evolution (LTE) eNodeBs or 5G New Radio (NR) gNodeBs, mini access nodes, home eNodeBs or gNodeBs, etc., and may include a plurality of antenna elements arranged in one or more sets or arrays, wherein each set or array is configured to steer or form one or more beams over a sector. Further, the antenna elements can include both transmit antenna elements and receive antenna elements. For example, a single antenna array can include 128T128R, 64T64R, 32T32R, 16T16R, or 8T8R. While the total number of antenna elements varies based on the access node, when the access node starts deploying a new radio air interface, this can cause a reduction in the number of antenna elements available to be used. The reduction in the first number of antenna elements is caused by the access node being configured to deploy a second radio air interface using a second number of antenna elements from the plurality of antenna elements.

Further, at 520, a subcarrier spacing is increased for at least one radio air interface deployed by the access node. Since the change in antenna configuration may result in a reduced spectral efficiency for one or more radio air interfaces deployed by the access node, the subcarrier spacing for these one or more radio air interfaces can be increased to improve the spectral efficiency (or to counter any reduction in the spectral efficiency). For example, if the first radio air interface deployed by the access node is a 5G radio air interface, and the second radio air interface deployed by the access node is a 4G radio air interface, the 5G radio air interface (i.e. the first radio air interface) can be configured with a 30 kHz subcarrier spacing. Thus, the spectral efficiency of the 5G radio air interface is improved to counter the reduction in the antenna elements used to deploy the 5G radio air interface. Alternatively or in addition, the first radio air interface can be a 4G radio air interface, and the second radio air interface can be a 5G radio air interface. In such embodiments, adjusting the subcarrier spacing further comprises increasing the subcarrier spacing for the second radio air interface (i.e. the 5G radio air interface). Further in an exemplary embodiment, if both first and second radio air interfaces are 5G radio air interfaces (i.e., the access node is configured to switch from deploying one 5G radio air interface using an antenna array to deploying two 5G radio air interfaces using the same antenna array), then the subcarrier spacing of either one or both radio air interfaces can be increased. Thus, the subcarrier spacing is increased from a 15 kHz subcarrier spacing to one or more of: a 30 kHz subcarrier spacing, a 60 kHz subcarrier spacing, or a 120 kHz subcarrier spacing. Further, a selected subcarrier spacing is transmitted to all wireless devices within a sector via, for example, a master information bit (MIB). Similarly, these operations may be repeated for additional wireless sectors deployed by additional antenna arrays of the access node. In addition, these determining and adjusting operations are repeated for different radio air interfaces deployed within different sectors. For example, since each antenna array is configured to deploy one or more radio air interfaces within a sector, these operations can be independently performed for each antenna array based on the air interface needs in different sectors, or based on a spectral efficiency of each sector. Further, the different subcarrier spacings can be selected based on a size of the subset of antenna elements used to deploy each radio air interface.

Figure 6A:
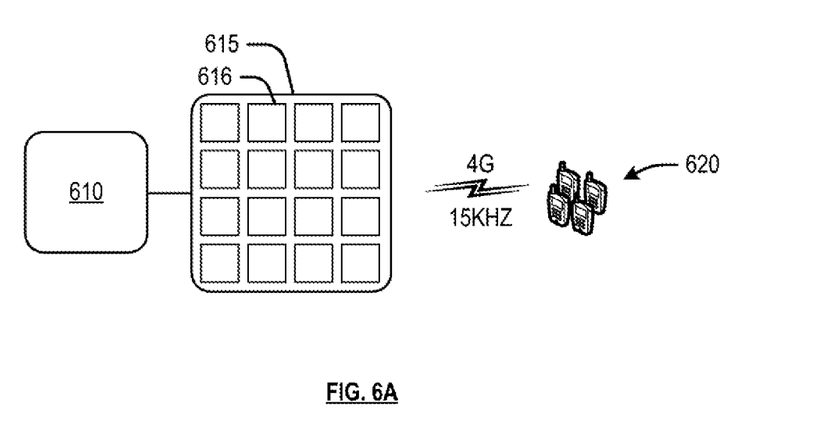
FIGS. 6A-6B illustrate an exemplary change in an antenna configuration of an access node, and selection of a subcarrier spacing based thereon.
Figure 6B:
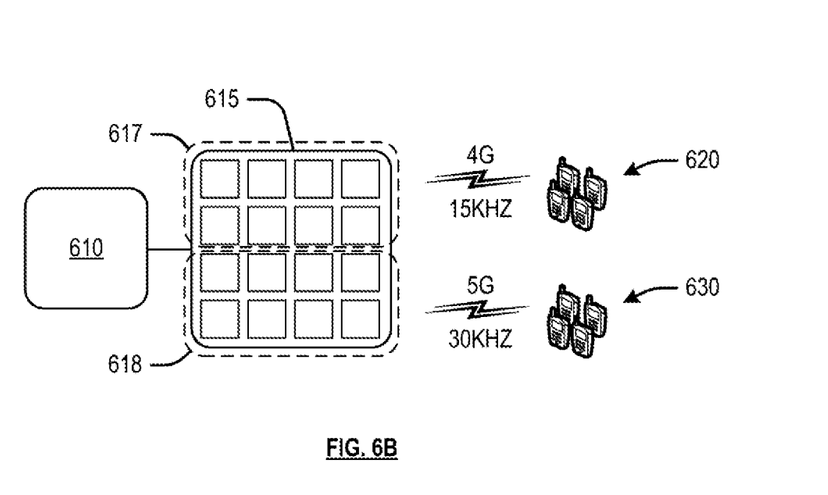
Figure 7A:
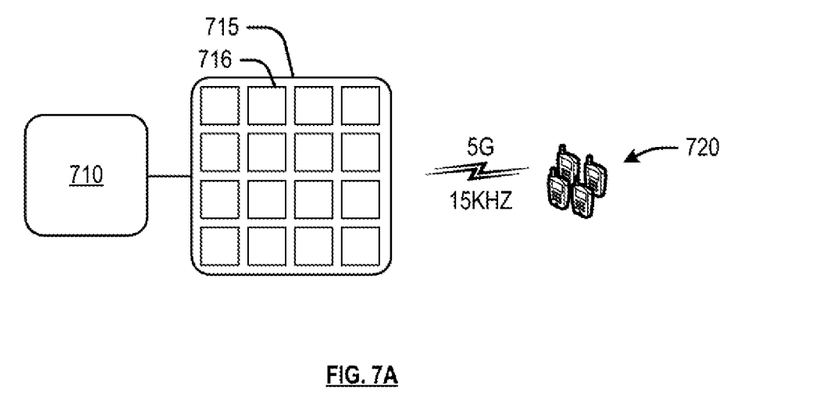
FIGS. 7A-7B illustrate another exemplary change in an antenna configuration of an access node, and selection of a subcarrier spacing based thereon.
Figure 7B:
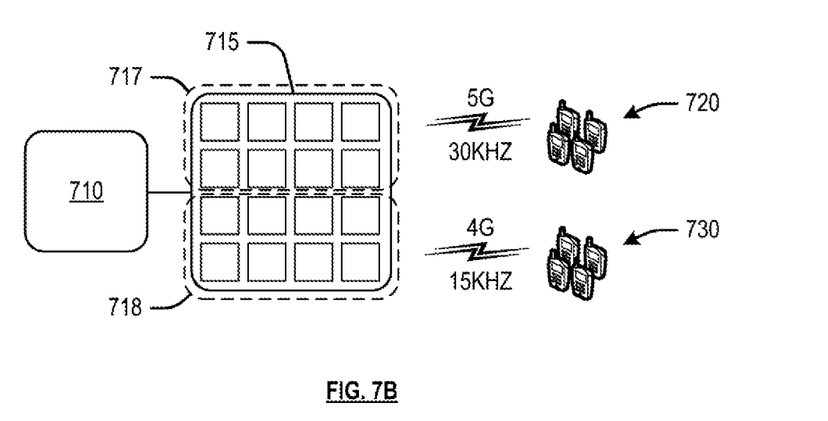
Figure 8A:
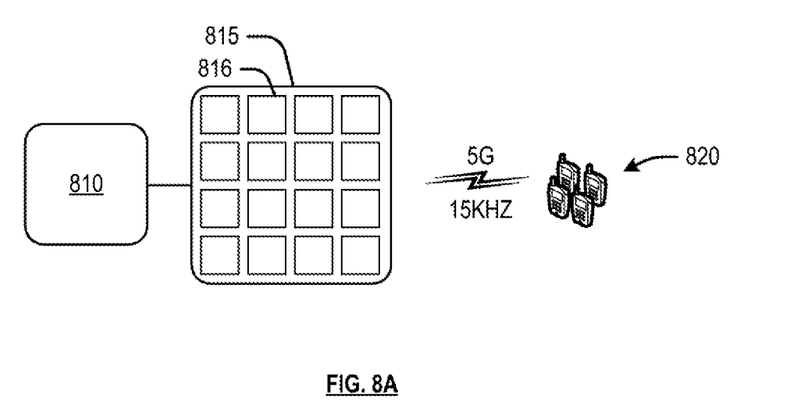
FIGS. 8A-8B illustrate another exemplary change in an antenna configuration of an access node, and selection of a subcarrier spacing based thereon.
Figure 8B:
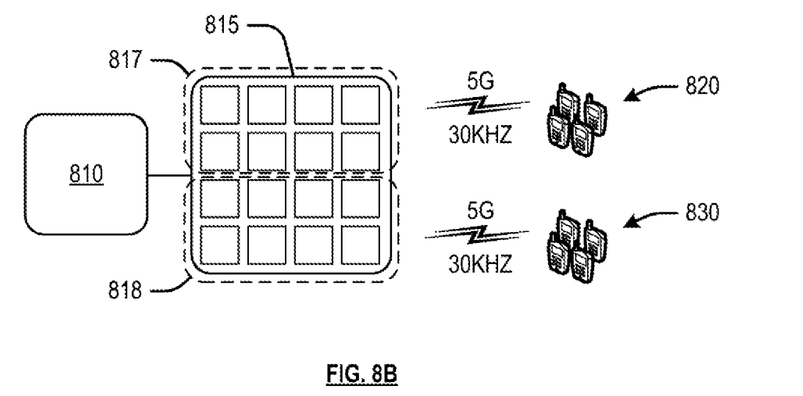

FIGS. 6-8 illustrate various changes in antenna configurations, and exemplary selections of subcarrier spacing based thereon. For example, FIGS. 6A-6B illustrate subcarrier spacing selection for an access node currently deploying a 4G radio air interface, and starting to deploy an additional 5G radio air interface. With reference to FIG. 6A, access node 610 is communicatively coupled to an antenna array 615, which further comprises a plurality of antenna elements 616. The components of access node 610 can include schedulers, processing nodes, remote radio heads, etc., and it will be understood by those having ordinary skill in the art that antenna array 615 can typically be incorporated within an access node 610, and is depicted separately here solely for illustrative purposes. In either case, access node 610 is configured to deploy a 4G radio air interface to which wireless devices 620 can attach. The 4G radio air interface uses all antenna elements 615, and is configured with a subcarrier spacing of 15 kHz. Now with reference to FIG. 6B, access node 610 begins to deploy a 5G radio air interface to which wireless devices 630 can attach. Deploying both 4G and 5G radio air interfaces is enabled by utilizing a first portion of antenna elements 617 to deploy the 4G radio air interface, and a second portion of antenna elements 618 to deploy the 5G radio air interface. Since fewer antenna elements are used for each radio air interface, a larger subcarrier spacing of 30 kHz is selected for at least the 5G radio air interface, thereby mitigating any potential reductions in spectral efficiency caused by the reduced quantity of antenna elements.

FIGS. 7A-7B illustrate subcarrier spacing selection for an access node currently deploying a 5G radio air interface, and starting to deploy an additional 4G radio air interface. With reference to FIG. 7A, access node 710 is communicatively coupled to an antenna array 715, which further comprises a plurality of antenna elements 716. The components of access node 710 can include schedulers, processing nodes, remote radio heads, etc., and it will be understood by those having ordinary skill in the art that antenna array 715 can typically be incorporated within an access node 710, and is depicted separately here solely for illustrative purposes. In either case, access node 710 is configured to deploy a 5G radio air interface to which wireless devices 720 can attach. The 5G radio air interface uses all antenna elements 715, and is configured with a subcarrier spacing of 15 kHz. Now with reference to FIG. 7B, access node 710 begins to deploy a 4G radio air interface to which wireless devices 730 can attach. Deploying both 5G and 4G radio air interfaces is enabled by utilizing a first portion of antenna elements 717 to deploy the 5G radio air interface, and a second portion of antenna elements 718 to deploy the 4G radio air interface. Since fewer antenna elements are used for each radio air interface, a larger subcarrier spacing of 30 kHz is selected for at least the 5G radio air interface, thereby mitigating any potential reductions in spectral efficiency caused by the reduced quantity of antenna elements.

FIGS. 8A-8B illustrate subcarrier spacing selection for an access node currently deploying a 5G radio air interface, and starting to deploy an additional 5G radio air interface. With reference to FIG. 8A, access node 810 is communicatively coupled to an antenna array 815, which further comprises a plurality of antenna elements 816. The components of access node 810 can include schedulers, processing nodes, remote radio heads, etc., and it will be understood by those having ordinary skill in the art that antenna array 815 can typically be incorporated within an access node 810, and is depicted separately here solely for illustrative purposes. In either case, access node 810 is configured to deploy a first 5G radio air interface to which wireless devices 820 can attach. The 4G radio air interface uses all antenna elements 815, and is configured with a subcarrier spacing of 15 kHz. Now with reference to FIG. 8B, access node 810 begins to deploy a second 5G radio air interface to which wireless devices 830 can attach. Deploying two 5G radio air interfaces is enabled by utilizing a first portion of antenna elements 817 to deploy the first 5G radio air interface, and a second portion of antenna elements 818 to deploy the second 5G radio air interface. For example, half of the antenna elements are used to deploy each 5G radio air interface, causing a corresponding reduction in spectral efficiency. Since fewer antenna elements are used for each radio air interface, a larger subcarrier spacing of 30 kHz is selected for both 5G radio air interfaces, thereby mitigating any potential reductions in spectral efficiency caused by the reduced quantity of antenna elements.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method for selecting a subcarrier spacing in a wireless network, the method comprising:
- determining a reduction in a first number of antenna elements used by an access node to deploy a first radio air interface, the reduction being caused due to the access node being reconfigured to deploy a second radio air interface using a second number of antenna elements; and
- responsive to determining the reduction in the first number of antenna elements, increasing a subcarrier spacing for the first radio air interface.

2. The method of claim 1, wherein determining the reduction in the first number of antenna elements comprises determining that the first number of antenna elements changes from 128 antenna elements to one of: 64 antenna elements, 32 antenna elements, or 16 antenna elements.

3. The method of claim 1, further comprising:
- increasing the subcarrier spacing for the second radio air interface.

4. The method of claim 3, wherein the subcarrier spacing is increased from a 15 kHz subcarrier spacing to one or more of: a 30 kHz subcarrier spacing, a 60 kHz subcarrier spacing, or a 120 kHz subcarrier spacing.

5. The method of claim 1, wherein the determining and increasing operations are performed for a first radio air interface deployed within a first sector, the method further comprising repeating the determining and increasing operations for a second radio air interface deployed within a second sector.

6. The method of claim 1, further comprising instructing the access node to broadcast the subcarrier spacing to wireless devices attached to the access node.

7. The method of claim 1, further comprising:
- determining a reduction in a spectral efficiency of the access node, the reduction being based on the reduction in the first number of antenna elements; and
- increasing the subcarrier spacing based on the reduction in spectral efficiency.

8. A processing node for selecting a subcarrier spacing in a wireless network, the processing node being configured to perform operations comprising:
- determining a reduction in a first number of antenna elements used by an access node to deploy a first radio air interface, the reduction being caused due to the access node being reconfigured to deploy a second radio air interface using a second number of antenna elements; and
- responsive to determining the reduction in the first number of antenna elements, increasing the subcarrier spacing for the first radio air interface.

9. The method of claim 8, wherein determining the reduction in the first number of antenna elements comprises determining that the first number of antenna elements changes from 128 antenna elements to one of: 64 antenna elements, 32 antenna elements, or 16 antenna elements.

10. The method of claim 8, further comprising increasing the subcarrier spacing for the second radio air interface.

11. The method of claim 10, wherein the subcarrier spacing is increased from a 15 kHz subcarrier spacing to one or more of: a 30 kHz subcarrier spacing, a 60 kHz subcarrier spacing, or a 120 kHz subcarrier spacing.

12. The method of claim 8, wherein the determining and increasing operations are performed for a first radio air interface deployed within a first sector, the method further comprising repeating the determining and increasing operations for a second radio air interface deployed within a second sector.

13. The method of claim 8, further comprising instructing the access node to broadcast the subcarrier spacing to wireless devices attached to the access node.

14. The method of claim 8, further comprising:
- determining a reduction in a spectral efficiency of the access node, the reduction being based on the reduction in the first number of antenna elements; and
- increasing the subcarrier spacing based on the reduction in spectral efficiency.

* * * * *